US010068500B2

(12) United States Patent
Jordan et al.

(10) Patent No.: US 10,068,500 B2
(45) Date of Patent: Sep. 4, 2018

(54) COLOR DISPLAY SYSTEM

(71) Applicant: The Sherwin-Williams Company, Cleveland, OH (US)

(72) Inventors: Jacqueline L. Jordan, Allen, TX (US); Paul D. Cobb, Westlake, OH (US); Sara B. Frisk, Chicago, IL (US); Matthew A. Stiffler, Evanston, IL (US); Shu Kuen Chang, Evanston, IL (US); Jeewon Jung, Boston, MA (US); J. Randolph Plemel, Cleveland, OH (US); John Grimley, Cleveland, OH (US); Michelle Ha, Cleveland, OH (US); Anastasios G. Karahalios, Cleveland, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 730 days.

(21) Appl. No.: 14/546,168

(22) Filed: Nov. 18, 2014

(65) Prior Publication Data

US 2015/0140520 A1 May 21, 2015

Related U.S. Application Data

(60) Provisional application No. 61/905,683, filed on Nov. 18, 2013.

(51) Int. Cl.
*G09B 19/00* (2006.01)
*G09F 5/04* (2006.01)
(Continued)

(52) U.S. Cl.
CPC ................ *G09F 5/04* (2013.01); *A47F 7/146* (2013.01); *B44D 3/003* (2013.01); *G09F 5/00* (2013.01); *A47F 11/06* (2013.01)

(58) Field of Classification Search
USPC ................ 434/72, 74, 75, 98, 99, 100, 105; 40/124, 124.4, 493, 494; 211/49.1, 50,
(Continued)

(56) References Cited

U.S. PATENT DOCUMENTS 1,448,664 A * 3/1923 Hull .......................... G09F 7/22 211/169
3,579,880 A * 5/1971 Murphy .................... G09F 7/02 40/473
(Continued)

OTHER PUBLICATIONS

The International Search Report and the Written Opinion dated Mar. 31, 2015 in corresponding International Application No. PCT/US14/66124.
(Continued)

*Primary Examiner* — Kurt Fernstrom
(74) *Attorney, Agent, or Firm* — DLA Piper LLP (US)

(57) ABSTRACT

Color display systems are disclosed, wherein the color display system includes a main display unit and a secondary display unit. The main display unit can include a plurality of rotatable color selection pods where one side of the color selection pod displays a color(s) and the other side of the color selection pod includes receptacles that can hold color chips. The color selection pods are arranged in columns, and each column can represent a particular color family or color category. The secondary display unit can include a first sub-display and a second sub-display, with each sub-display displaying colors of particular categories or themes. The color display system can also include a central work center which can include a work table and rotating color display.

28 Claims, 10 Drawing Sheets

(51) Int. Cl.
*A47F 7/14* (2006.01)
*B44D 3/00* (2006.01)
*G09F 5/00* (2006.01)
*A47F 11/06* (2006.01)

(58) Field of Classification Search
USPC ........................................ 211/53, 56, 58, 163
See application file for complete search history.

(56) References Cited

U.S. PATENT DOCUMENTS

| | | | | |
|---|---|---|---|---|
| 4,003,470 | A | 1/1977 | Lagorio et al. | |
| 4,815,612 | A * | 3/1989 | Leo, Sr. | A47F 5/02 211/189 |
| 4,840,279 | A | 6/1989 | Cobb et al. | |
| 5,029,715 | A * | 7/1991 | Strada | A47F 7/163 211/128.1 |
| 5,096,073 | A * | 3/1992 | O'Brien | A47F 5/02 211/163 |
| 5,746,600 | A * | 5/1998 | Chang | B44D 3/003 434/367 |
| 6,195,923 | B1 * | 3/2001 | Gorman | G09F 11/02 40/479 |
| 6,283,608 | B1 * | 9/2001 | Straat | A47B 97/00 312/223.5 |
| 6,416,612 | B1 * | 7/2002 | Lerner | B44D 3/003 156/277 |
| 6,427,853 | B2 | 8/2002 | Brozak, Jr. | |
| 6,533,130 | B1 * | 3/2003 | Padiak | A47F 3/001 211/128.1 |
| 6,575,314 | B2 * | 6/2003 | Lung | A47F 5/05 211/163 |
| 6,578,718 | B2 * | 6/2003 | Levy | A47F 7/0042 211/50 |
| 6,994,553 | B2 * | 2/2006 | DaRif | G09F 5/04 434/98 |
| 7,000,786 | B2 * | 2/2006 | Heiner | A47F 5/02 211/163 |
| 7,204,376 | B2 * | 4/2007 | Richardson | A47F 5/00 211/126.4 |
| D680,350 | S * | 4/2013 | Peake-Atkins | D6/662.1 |
| 2005/0140691 | A1 | 6/2005 | Rice | |
| 2011/0266337 | A1 * | 11/2011 | Reynolds | G06Q 30/02 235/375 |

OTHER PUBLICATIONS

"Home Depot," Innovative Marketing Solutions, Inc., 2012, pp. 1-42.
"Lowe's," Innovative Marketing Solutions, Inc., 2012, pp. 1-60.
"Menards," Innovative Marketing Solutions, Inc., 2012, pp. 1-5.
"Walmart," Innovative Marketing Solutions, Inc., 2012, pp. 1-14.
"Ace Hardware," Innovative Marketing Solutions, Inc., 2012, pp. 1-10.
"Crafty Beaver," Innovative Marketing Solutions, Inc., 2012, pp. 1-3.
"Sears Hardware," Innovative Marketing Solutions, Inc., 2012, pp. 1-11.
"True Value," Innovative Marketing Solutions, Inc., 2012, pp. 1-4.
Benjamin Moore, Innovative Marketing Solutions, Inc., 2012, pp. 1-20.
"Glidden Professional," Innovative Marketing Solutions, Inc., 2012, pp. 1-8.
"PPG Industries," Innovative Marketing Solutions, Inc., 2012, pp. 1-13.
"Sherwin-Williams," Innovative Marketing Solutions, Inc., 2012, pp. 1-10.
"Warnimonts," Innovative Marketing Solutions, Inc., 2012, pp. 1-8.
"Apco," Innovative Marketing Solutions, Inc., 2012, pp. 1-3.
"Dunn-Edwards," Innovative Marketing Solutions, Inc., 2012, pp. 1-4.
"Kelly Moore," Innovative Marketing Solutions, Inc., 2012, pp. 1-7.
"Miller," Innovative Marketing Solutions, Inc., 2012, pp. 1-15.
"Parker Paint," Innovative Marketing Solutions, Inc., 2012, pp. 1-7.
"Pathmann," Innovative Marketing Solutions, Inc., 2012, pp. 1-15.
"Prather," Innovative Marketing Solutions, Inc., 2012, pp. 1-6.
"Rodda," Innovative Marketing Solutions, Inc., 2012, pp. 1-4.
"Meijer," Innovative Marketing Solutions, Inc., 2012, pp. 1-5.

* cited by examiner

COLOR DISPLAY SYSTEM

CROSS-REFERENCE TO RELATED APPLICATIONS

This application claims priority from and claims the benefit of U.S. Provisional Application No. 61/905,683, filed Nov. 18, 2013, entitled "Color Display System," which is hereby incorporated by reference.

TECHNICAL FIELD

The present disclosure relates generally to color tools and techniques, and more particularly to systems, methods and apparatus for creating, identifying, displaying, recommending and/or selecting colors and decorating products, such as paint products, for example.

SUMMARY

According to an aspect of the present disclosure, a color display system includes a main display containing a plurality of color selection pods, each having two sides, with a first side containing a first designated color and a second side containing one or more receptacles. Each receptacle holds one or more removable color chips. The color selection pods are rotatable about one or more vertical supports. The main display further includes one or more beacons adjacent to the color selection pods. The main display further includes one or more storage bases positioned beneath the color selection pods and one or more lighting fixtures positioned above the color selection pods.

The color display system further includes a secondary display containing a first sub-display and a second sub-display. The first and second sub-displays include color selection pods and color chips directed to one or more particular categories or themes. The color display system further includes a central work center containing a work table and a rotating color display unit.

BRIEF DESCRIPTION OF THE DRAWINGS

The present disclosure may be better understood when read in conjunction with the appended drawings. It should be understood that the drawings represent exemplary embodiments of the instrumentalities described herein. As a result, the drawings should not be considered as limiting in any way. In the drawings.

DETAILED DESCRIPTION

An aspect of the present disclosure is to provide an extensible and flexible system of tools for color display, such as a display used for paint and paint products. In addition, the present disclosure simplifies the process of color selection by creating different points of entry for the differing levels of consumer color confidence. As a result, beginners and experts alike (e.g., "do-it-yourself" users, architects, designers, contractors, etc.) may utilize and benefit from the systems and methods described herein. Another aspect of the present disclosure entails providing a visually striking and unique color display and selection system and apparatus. These and other aspects may be achieved by the exemplary systems, methods and apparatus described herein, all of which are directed to creating, identifying, displaying, recommending and/or selecting colors and decorating products.

Figure 1:
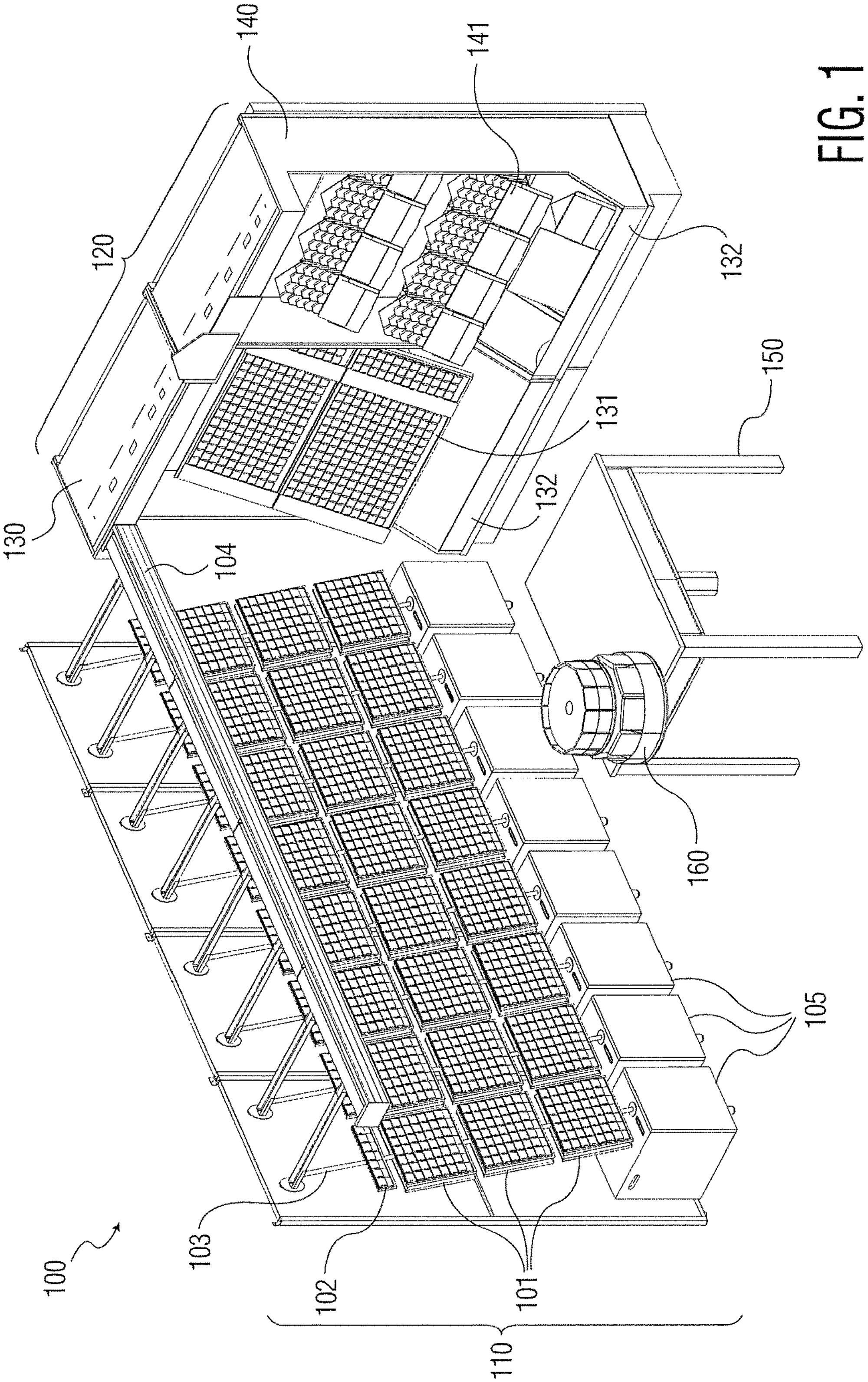
FIG. 1 illustrates an exemplary color display system according to the present disclosure.
Figure 2:
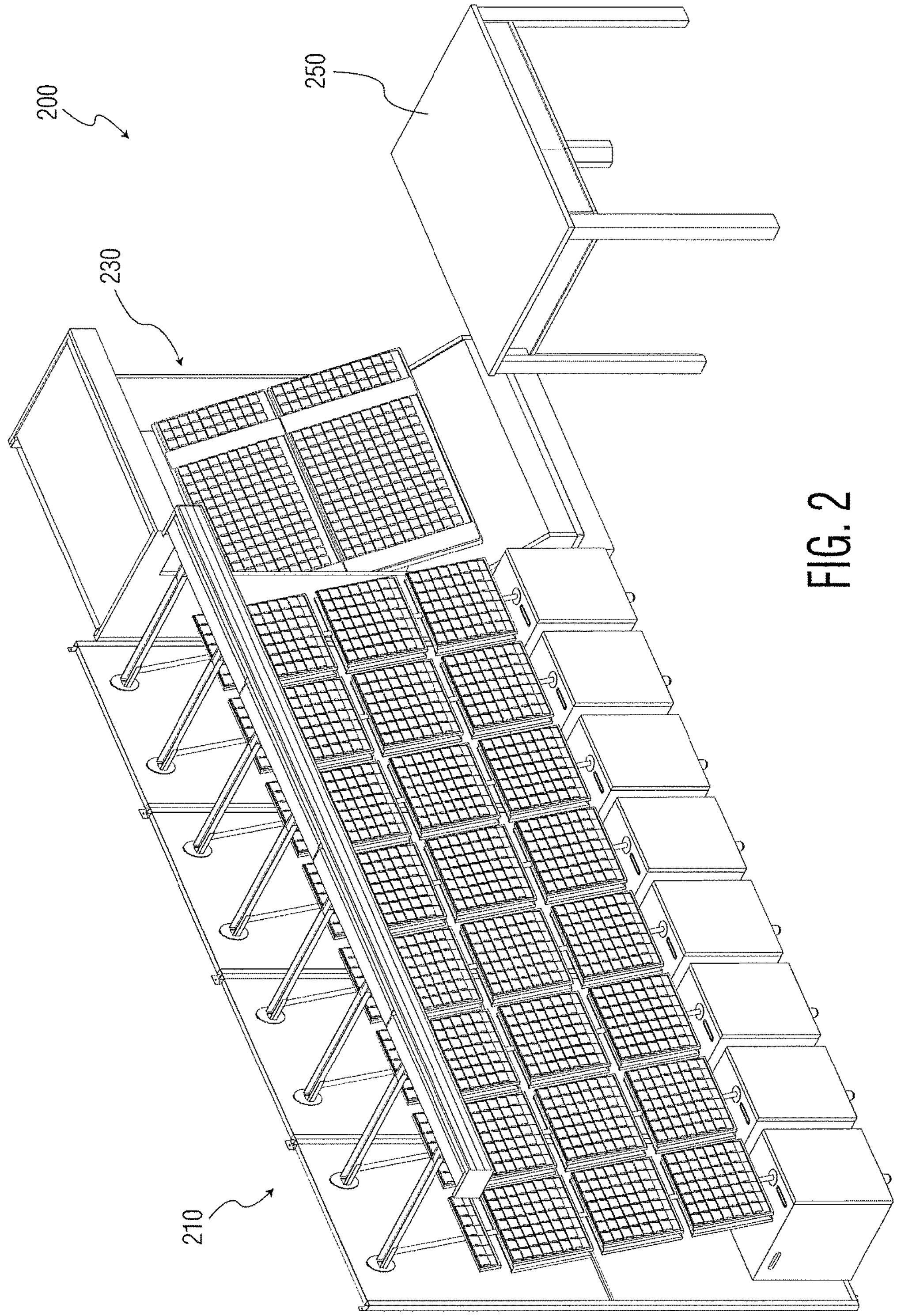
FIG. 2 illustrates another exemplary color display system according to the present disclosure.

In one aspect, the present disclosure provides a color-grouping display system that includes at least one main display, at least one secondary display and at least one central work center. This display system may be arranged such that the main display(s) (110) and the secondary display(s) (120) are positioned in a general 'L' shape with respect to one another, as shown in FIG. 1, or the main display(s) (210) may be positioned along side a secondary display(s) (230), as shown in FIG. 2. The central work center(s) may be positioned generally in front of the main display(s) and/or the secondary display(s), as desired. In fact, the components of this display system may be positioned and/or oriented in any desirable arrangement without departing from the scope of this disclosure. As should be understood, the display system may be utilized in a variety of different manners and implementations. For example, the display system may be utilized for paint colors and located in a store or other commercial environment, such as installed inside of a store or similar establishment, for purposes of displaying paint color alternatives and sale of paint and related products to consumers.

A main display according to the present disclosure may include one or more color selection pods, each of which may be connected to one or more supports, such as one or more vertical and/or horizontal and/or diagonal supports, one or more color beacons, and one or more storage bases. The main display may also optionally include a decorative elongated display positioned across a front of the main display behind which one or more optional lighting fixtures may be positioned. In an embodiment, a curved reflector may be mounted onto the one or more lighting fixtures to provide a reflective surface for improved illumination of the main display.

Each color selection pod may include two or more sides, at least one of which displays one or more colors and at least one of which includes one or more receptacles. Each color selection pod may be of any desired shape or configuration, such as generally square, circular, triangular, rectangular, etc. The sides may be flat and/or slightly curved, or optionally any other desired configuration. The receptacles may be configured to hold and display one or more removable color swatches (hereafter, "color chips" or "chips"), and each receptacle may be permanently or removably affixed to a color selection pod. In one example, all colors held and/or displayed by a particular color selection pod may pertain to a particular color family, all chips held in a particular receptacle are the same, each receptacle holds chips of a different color, and all chips are a particular shade of a solid color displayed by one side of the particular pod. As should be understood, the receptacles may hold chips of any variety of color(s) or color families.

As noted above, the color selection pods may each be connected to one or more supports, which comprises a vertical support in the current example. These vertical supports may be configured to support and hold each color selection pod in a position at which a user may view and interact with said color selection pods. In one embodiment, the main display may be arranged to include multiple vertical supports, each supporting one or more color selection pods. Optionally, the vertical supports may be configured such that the color selection pods are rotatably connected thereto. In other words, the color selection pods may be connected to the vertical supports in a manner that enables the color selection pods to rotate about the vertical supports, whether manually, such as by being physically rotated by hand, electronically, mechanically and/or by any other means. This may be accomplished, for example, by defining a cavity between sides of a color selection pod that fits onto and rotates about a vertical support. Alternatively, the color selection pods may be comprised of two portions, a front portion and a back portion, configured to connect to each other about the vertical support. As should be understood, there are various approaches that may be utilized within the scope of the present example.

In addition to supporting color selection pods, the one or more supports may further be configured to support and display one or more color beacons. In this embodiment, a color beacon may be supported on a vertical support and may be stationary on the vertical support, however, optionally the color beacon may be rotatable as well. For purposes of this disclosure, a color beacon is a color display apparatus configured with a number of chip receptacles for holding and displaying color chips of a particular color range. For example, a color beacon may be configured with one or more receptacles that each holds removable color chips of a particular color. As with the color selection pods, all color chips within a particular color beacon may pertain to a particular color family. Moreover, all color selection pods and beacons connected to a particular vertical support may hold and/or display colors belonging to a particular color family. As should be understood, the color beacon may hold chips of any variety of color(s) or color families.

At a base of each vertical support may be one or more storage bases. The storage bases may be configured to hold and store color chips and/or other supplies and information. In one embodiment, the base may be provided with one or more removable front panel(s) to access one or more interior compartment(s) or sliding drawer(s). One or more shelving units may be positioned within the interior compartments. The storage bases may comprise one or more return slots that can be used for color chip return, for example. In another exemplary embodiment, a single storage base may be provided at a base of a single vertical support. In yet another exemplary embodiment, a single storage base may be provided at the base of more than one vertical support.

In one exemplary embodiment, a main display according to the present disclosure may include twenty-four (24) 2-sided color selection pods, each having a solid block of color on one side and forty-nine (49) color chip receptacles (each holding removable color chips) arranged as seven rows and seven columns (7×7) on the other side. As should be understood, the number of color selection pods as well as the number (and orientation) of the color chip receptacles may be varied to be more or less, as may be desired. The solid block of color on a particular color selection pod may represent a particular color family, color category and/or a saturation level of a color, which may serve as an introduction to the range of color chips displayed on the other side of said color selection pod. The solid blocks of color on color selection pods and/or the removable color chips may further be provided with indicia representative of its color, such as particular names, numbers and/or letters.

The actual colors included in the color selection pods may be selected according to popularity (e.g., based on historical sales data, such as gallons of paint sold of a particular color) or any other desired criteria. Additionally and/or alternatively, colors included in a color selection pod may be determined by updating and/or revising an initial pallet of colors. For example, a "strip" of colors, which may be defined as a group of colors (e.g., seven (7) colors) belonging to a particular color family and including colors ranging from high saturation to low saturation, such as to be contained in a color selection pod, may be modified by creating one or more new colors. For example, a new color may have a formulation providing a medium saturation (i.e., a saturation lower than the highest saturation on the color strip and higher than the lowest saturation on the color strip), and thus be inserted into the color strip at a location that reflects its medium color saturation. In order to maintain the color strip at its initial color count (e.g., seven (7) colors), one or more colors could be removed from the color strip, such as removing the lightest color, and the removed lightest color combined with other 'light' colors (removed from other color strips) to form a separate color family or families, and/or color categories, for example "whites," "neutrals," "cool neutrals," "warm neutrals," etc. For example, in the context of a color display system, the revised color strips and/or these newly formed color families/categories may be displayed via one or more color selection pods.

The color selection pods may be arranged in any manner, such as eight (8) side-by-side vertical sub-assemblies (hereafter "columns") of three (3) pods each (i.e., as a three by eight (3×8) matrix). A top of each column may include a color beacon having seven (7) more chip receptacles, each holding removable color chips; and a bottom of each column may include a storage base. Each column also includes a vertical support that holds each of the three color selection pods and the color beacon in place, and that connects to the storage base. In an exemplary embodiment, one vertical support holds one column of three (3) pods and one color beacon in place, and connects to one storage base. In another exemplary embodiment, two (or more) vertical supports holds two (or more) columns of three (3) pods (or more) and two (or more) color beacons in place, and connects to one storage base. Each vertical support may be positioned to be completely vertical (i.e., perpendicular to the ground) or one or more of the vertical supports may be slightly angled. In this exemplary embodiment, the three color selection pods in each column are optionally rotatably connected to the vertical support, which means they are able to rotate about the vertical support to expose a side having a solid block of color or a side having the chip receptacles.

Each column in this exemplary embodiment may represent a particular color family. For example, a first column may represent the red color family, another column may represent the orange color family, and other columns may represent other color families such as yellow, green, blue, purple, etc. Notably, color families may also be categorized as 'neutral' colors (e.g., cool neutrals and warm neutrals), whites, pastels, blacks, pastels and others. In one particular embodiment, the red, orange, yellow, green, blue and purple color families may be grouped in pairs (i.e., two pods of each per column), followed by a pod for warm neutrals or cool neutrals. Whites and pastels may be grouped together to form one column, and one column may include cool neutrals, warm neutrals and blacks.

Within each column, the colors may be vertically arranged according to color saturation. For example, the color beacon at the top of each column may hold and display the brightest color chips belonging to the color family below it. The color chips included in these color beacons may or may not be repeated in one or more of the color selection pods. The three color selection pods below the color beacon in each column may then include and display colors that are progressively less saturated; and within each color selection pod, the color chips may be arranged with the lightest colors at the top and the darkest colors at the bottom. Other color arrangements and selections are also envisioned by the present disclosure. In other arrangements, each beacon and color selection pod within a color display system may display a different color or colors may be repeated. For example, the solid block of color and color chips held in the receptacles on each color selection pod and the chips held in the beacons may all contain different colors. Alternatively, colors may be repeated as may be desired in the color selections and/or beacons.

The main display may also include one or more signs that denote a color family and/or color category of a particular column. For example, one column may include a sign that says "Neutral" above the color selection pods of that column to denote that the colors in that column belong to the "neutral" color category. These signs may be positioned on the main display at any desired location, for example, a sign may be located above a particular column to which it references. In certain embodiments, a sign may take the place of a beacon, whereas in other embodiments, a sign may be displayed in addition to a beacon of a particular column. In one exemplary embodiment, in which a main display includes twenty-four (24) color selection pods (eight (8) columns of three (3) color selection pods) each comprising forty-nine (49) color chip receptacles, six (6) beacons each comprising seven (7) color chip receptacles and each positioned above a different column of color selection pods, and two (2) signs each above a different column of color selection pods, the main display may hold 1218 individual color chips (twenty-four (24) color selection pods times forty-nine (49) chip receptacles plus six (6) beacons times seven (7) chip receptacles equals 1218 chip receptacles, each holding color chips). As should be understood, other configurations are also possible as may be desired so that the main display may hold more or less color chips.

A secondary display according to the present disclosure may include one or more suspended color selection pods, each having a plurality of receptacles configured for holding and displaying removable color chips. The color chips may represent a variable selection of colors that complement the colors included in the main display and/or that are dedicated to a particular trend, region (e.g., Northeast or Southwest regions of the U.S.), concept or any other desired category or theme. In one embodiment, the color chips in the secondary display may represent colors deemed to be 'classic' or 'traditional.' As noted above, the secondary display may be positioned along side the main display, adjacent and perpendicular to the main display (e.g., to form a general 'L' shape, a general "I" shape), or in any other desired position or orientation. In addition, in other examples, the number of colors or color chips contained in the secondary display may be less in number than the number of colors or color chips contained the main display.

In one embodiment, the secondary display may include multiple sub-displays, such as a first sub-display and a second sub-display, for example. The first sub-display may include color selection pods and color chips directed to one or more particular categories or themes, and the second sub-display may include color selection pods and color chips directed to other categories or themes, for example, a more selective or focused category or theme. For example, a first sub-display may display a variety of color chips representative of historic, classic, regional and/or trendy colors. The color chips in the first sub-display may be arranged and grouped together by color family and/or color saturation, as examples. A second sub-display may display preselected colors that are arranged and grouped together according to predetermined looks or color combinations, such as those determined by designers and the like. For example, the second sub-display may include groups of specially selected and designed color palettes that each includes a combination of colors that do not necessarily belong to the same color family, but instead complement each other and achieve a particular look or style. In one embodiment, each grouping of colors in this second sub-display may represent successful design and presentation combinations. This second sub-display may also be associated with a particular designer or entity, such as HGTV™, for example, and contain color combinations associated with, approved by, and/or reflective of such designer or group. As should be understood, the first sub-display and the second sub-display may display one or more color(s) in any variety of color families or categories.

Optionally, the secondary display (including the first and/or second sub-display) may include one or more lighting fixtures to highlight the displayed color chips and one or more storage bins at a base of the secondary display for storage of color chips and/or other information and materials. In an embodiment, a curved reflector may be mounted onto the one or more lighting fixtures which can provide a reflective surface for improved illumination of the first and/or second sub-display. The secondary display (including the first and/or secondary sub-display) may include slots on the top of the display which can allow heat from the one or more lighting fixtures to disperse.

The secondary display may also include one or more signs that denote a category of colors (e.g., historic, classic, etc.) a trend and/or a region (e.g., New England) that inspired the displayed colors. For example, a sign pertaining to one group of color chips may be labeled as "Timeless," while another sign referring to another group of color chips may be labeled "Historic," and still another sign may refer to a certain group of color chips as "New England" to denote the region that inspired that certain group.

In one exemplary embodiment, the first sub-display may be configured to hold and display a combination of different categories of color chips. For example, the first sub-display may include one hundred and forty (140) "Historic" colors, one hundred and sixty-eight (168) "Classic" colors, thirty (30) "Regional" colors and six (6) "Trend" (or other special palette) colors.

In another exemplary embodiment, the second sub-display may be configured to hold and display different combinations of color palettes. For example, the second sub-display may include eight (8) different color palettes, each containing twenty (20) colors that can be mixed and matched for color coordination.

A central work center in accordance with the present disclosure may include one or more work tables positioned relative to the main and/or secondary displays. The one or more work tables may be positioned in front or along side of the main and/or secondary displays. This work table may be configured to support and/or display color selection tools that can assist users experience colors during their color selection experience. One such color selection tool may include a color display device, which may be rotatable, and may include one or more pockets or receptacles (housed on one or more tiers or levels) for holding and displaying removable color chips, post cards, manuals, images, look-books, floor samples, carpet samples and other materials and information. This rotating color display may be sized and/or configured as desired. Optionally, the materials and information housed in this rotating color display device may be changed or modified periodically to coincide with seasonal trends or other categories or themes.

The one or more work tables may be configured to be counter-height and can allow users to engage in color selection activities from both a seated position and a standing position. The one or more work tables may be configured to other heights as desired. In an embodiment, the work table may also include a sliding surface underneath the table's top which can be extended in order to accommodate large stores or activity. The work table may also include a built-in drawer or drawers for storage and one or more stools to allow users to sit while engaging in color selection activities.

Color Coding System

The color chips in the main display and/or the secondary display may each be named or coded in a manner that is indicative of a color family and/or its position and/or location in the color display system. For example, each color chip may be assigned an alpha-numeric code such that the alpha portion of the code denotes a color family or color category (e.g., "R" for red color family, "H" for historic color category, etc.) and one or more numbers denote the particular column, color selection pod and/or chip receptacle location in which the color chip is displayed. These alpha-numeric codes may be included directly on the color chips, on the color selection pods and/or in other desired locations. The color selection pods may also be labeled with a range of alpha-numeric codes, to denote the range of color chips stored and displayed therein. The alpha-numeric codes may also be selected sequentially, such that larger codes (i.e., codes having larger numbers) may indicate a position that is further to the right of one of the displays, and smaller codes may indicate a position that is further to the left of one of the displays. The foregoing is just one exemplary manner for coding the various colors displayed in the color display system of the present disclosure. It should be understood, however, that other naming and/or coding strategies may be implemented without departing from the scope of the present disclosure.

In addition to the alpha-numeric codes described above, the color chips and/or the color selection pods may include additional information, such as a light reflective value, reordering information, etc.

FIGURES

Turning now to the figures, various (non-limiting) exemplary embodiments according to the present disclosure are shown. FIG. 1 illustrates an exemplary color display system 100 according to the present disclosure. The system 100 includes a main display unit 110, a secondary display unit 120 and a central work station 150.

Figure 1A:
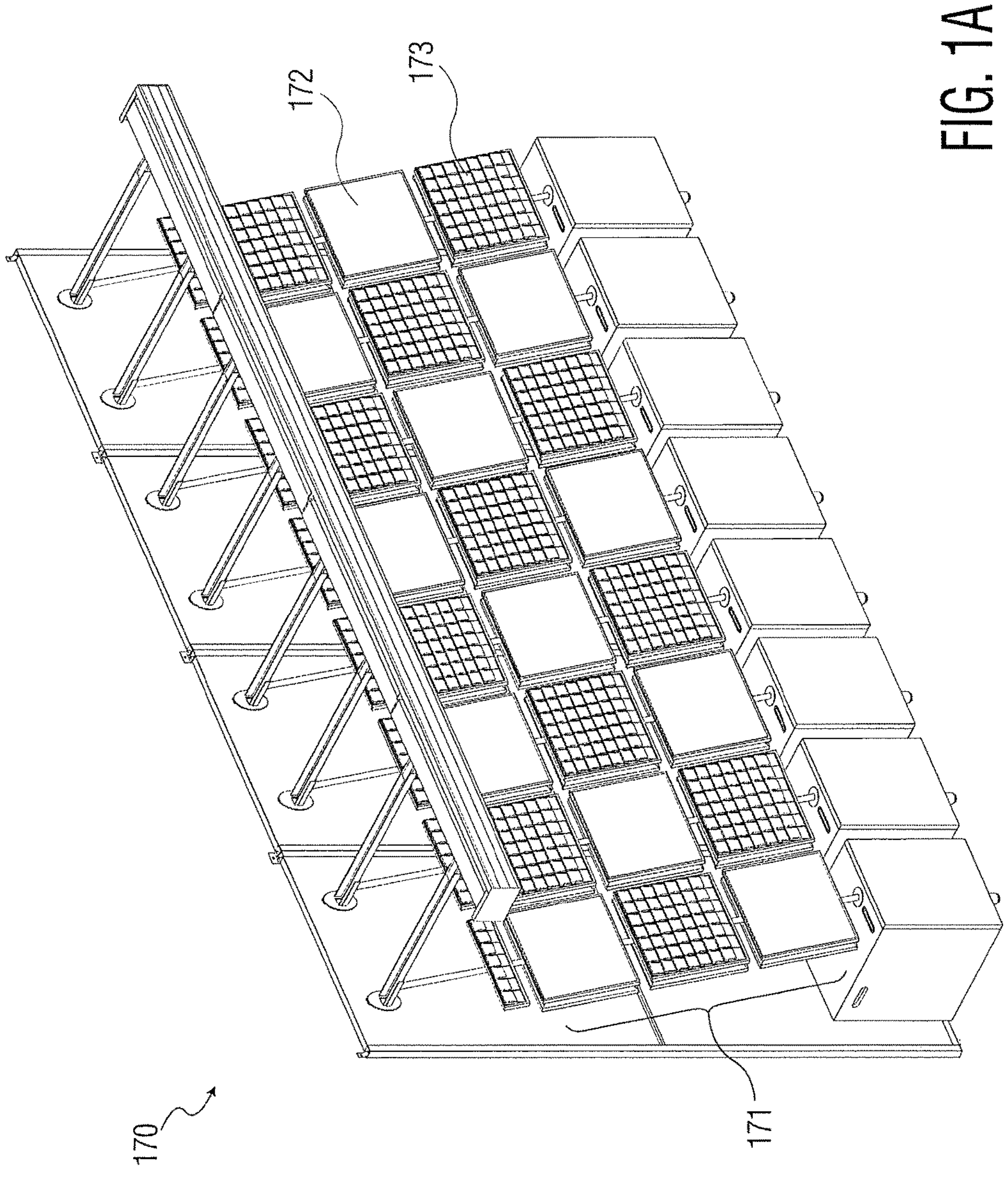
FIG. 1A illustrates an exemplary main display unit according to the present disclosure.

As shown in FIGS. 1 and 1A, the main display unit (110 in FIGS. 1 and 170 in FIG. 1A) includes a plurality of color selection pods (101 in FIGS. 1 and 171 in FIG. 1A), each of which has at least two sides. As shown in FIG. 1A, at least one side 173 includes a plurality of chip receptacles. The other side 172 of at least one of the color selection pods 171 may include a solid block of color. As shown in FIG. 1, the color selection pods 101 are optionally rotatably attached to a vertical support 103 such that each color selection pod 101 may rotate about said vertical support 103. Also connected to each vertical support 103 is a color beacon 102 that includes a plurality of chip receptacles. As with the color selection pods 101, the color beacons 102 may be affixed to the vertical supports 103 or one or more color beacons 102 may be rotatably attached to a vertical support 103. Other arrangements may also be utilized. In the exemplary embodiment of FIG. 1, three color selection pods 101 and one beacon 102 are connected to each vertical support 103. It should be understood, however, that other configurations (e.g., other quantities of color selection pods, beacons and/or vertical supports) may be included in the main display 110 without departing from the scope of the present disclosure. In addition, any or all of the vertical supports may be supplemented by or replaced by horizontal and/or diagonal supports, or supports of any other desired orientation.

As further shown in FIG. 1, a particular segment of the main display unit 110 may include two columns, each column comprising a vertical support to 103 to which three color selection pods 101, a color beacon 102 and a storage base 105 is connected. In the main display unit 110 of FIG. 1, four (4) segments are positioned and connected adjacent to one another to form said main display unit 110.

At the base of each vertical support 103 is a storage base 105 configured for storing color chips and/or other materials and information. Along a top portion of the main display 110 is a decorative elongated display 104 behind which optional lighting fixtures may be positioned.

Adjacent to the main display unit 110 is an optional secondary display unit 120. This secondary display unit 120 is positioned so as to form a general "L" shape with respect to the main display unit 110. It should be understood, however, that these components may be positioned to form other arrangements, configurations and the like. In certain embodiments, the main display unit 110 may be sized larger than the secondary display unit 120. In addition, in certain embodiments, designated product lines of colors to be emphasized may be contained in the main display unit 110 and other product lines of colors may be located in the secondary display unit 120.

The secondary display unit 120 includes two sub-displays, a first sub-display 130 and a second sub-display 140 in this example, although any number of sub-displays may be provided. Each sub-display 130, 140 holds one or more color selection pods 131, 141, respectively, comprising a plurality of chip receptacles. Optionally, a base portion of one or both of the sub-displays 130, 140 may include a storage drawer 132 for storing color chips and/or other materials and information.

The color display system 100 of FIG. 1 may also include a central work station comprising a central work table 150 that may be sized and positioned as desired. Optionally, the central work table 150 may include a sliding surface or table leaf (not shown) that may be extended to enlarge the working surface of the table 150. The central work table 150 may also include one or more storage drawers and one or more stools (not shown). The central work table 150 may also optionally hold one or more rotating color display units 160.

FIG. 2 illustrates another exemplary color display system 200 according to the present disclosure. Similar to the system 100 of FIG. 1, this exemplary system 200 includes a main display unit 210, a secondary display unit comprised of one sub-display 230, and a central work table 250. As shown, the main display unit 210 and the sub-display 230 are right next to each other, and the central work table 250 is positioned generally in front of the sub-display 230. As indicated above, other combinations and arrangements of the components described herein may be utilized to create any number of desired configurations.

Figure 3A:
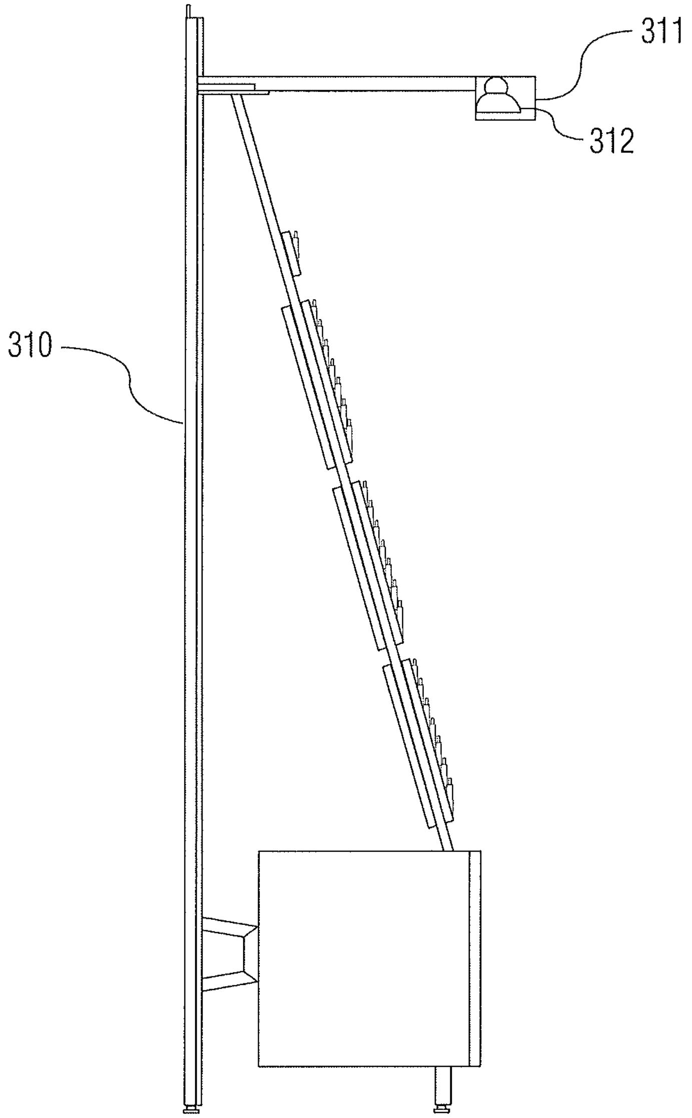
FIG. 3A illustrates a side view of an exemplary main display unit according to the present disclosure.

FIG. 3A illustrates a side view of an exemplary main display unit 310 according to the present disclosure. The main display unit 310 includes an optional decorative elongated display 311. An optional lighting fixture 312 is positioned behind the decorative elongated display 311.

Figure 3B:
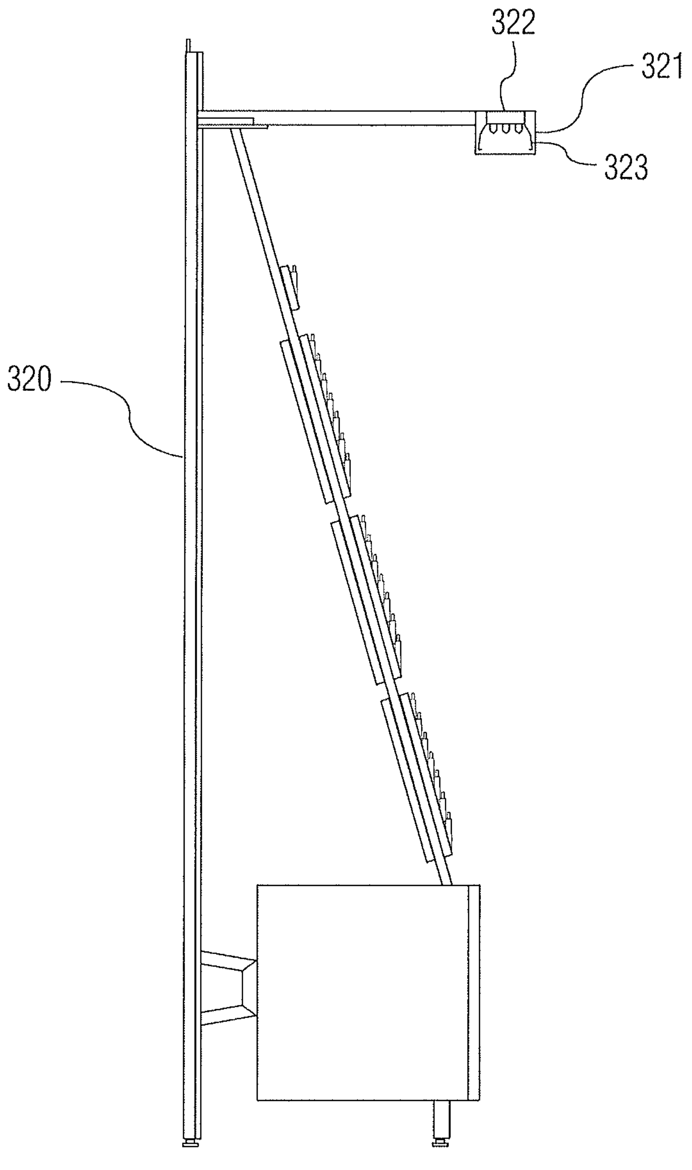
FIG. 3B illustrates a side view of another exemplary main display unit according to the present disclosure.

FIG. 3B illustrates a side view of another exemplary main display unit 320 according to the present disclosure. Similar to FIG. 3A, the main display unit 320 includes a decorative elongated display 321 and an optional lighting fixture 322 positioned behind the decorative elongated display 321. In this embodiment, a curved reflector 323 is mounted onto the lighting fixture.

Figure 4:
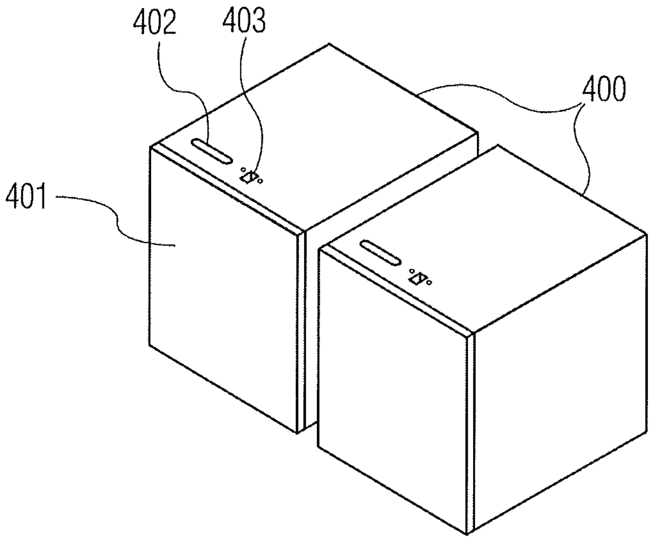
FIG. 4 illustrates exemplary storage bases of a main display unit according to the present disclosure.

FIG. 4 illustrates exemplary "single" storage bases 400 of a main display unit (not shown) according to the present disclosure. The storage base 400 includes a removable front panel 401, A return slot 402 may optionally positioned on the top of each storage base 400 and can be used for color chip return. A support cavity 403 is positioned on top of each storage base 400 in which a vertical support (not shown) can be connected. The location of the return slot 402 and support cavity 403 can vary as desired to vary the position of the chip return location and the vertical support location with respect to each storage base 400. As should be understood, the number of return slots 402 and support cavities 403 can vary as desired. In an exemplary embodiment, an end of a single vertical support (not shown) of a main display unit may connect to the support cavity 403 in order for a storage base 400 to be connected to, or a part of, the main display unit.

Figure 5A:
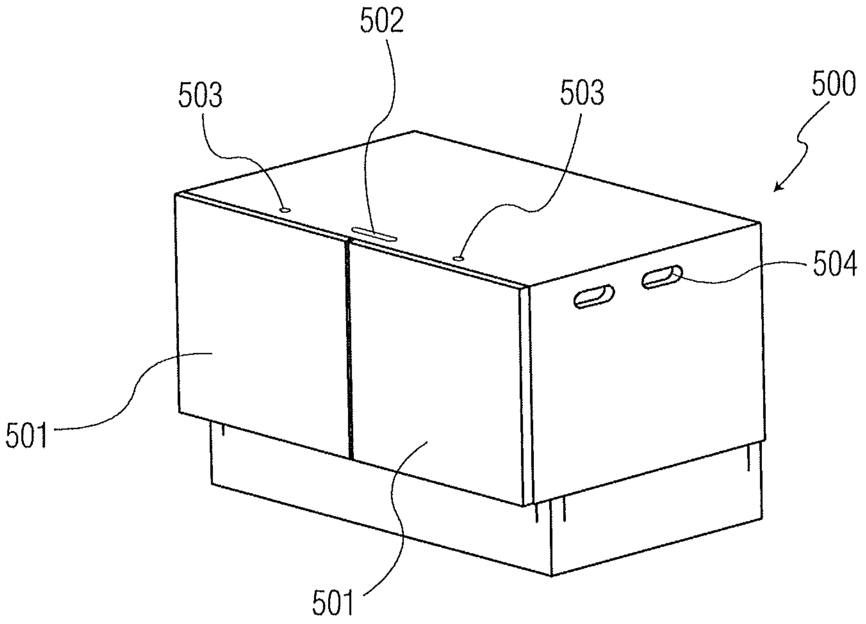
FIG. 5A illustrates another exemplary storage base of a main display unit according to the present disclosure.

FIG. 5A illustrates another exemplary storage base 500 of a main display unit (not shown) according to the present disclosure. The storage base 500 includes two removable front panels 501. In this embodiment, the exemplary storage base 500 comprises a "double" base to indicate that it may take the place of two or more "single" storage bases (e.g., base 400 of FIG. 4). One or more return slots 502 may be positioned on a top side (or lateral side) of the storage base 500 and can be used for color chip return, for example. One or more support cavities 503 may also be positioned on a top side of the storage base 500 in which vertical support(s) (not shown) can be positioned and connected. Any number of handle opening(s) 504 may be located on one or more lateral sides of the storage base 500 to provide for easy moving or relocation of the storage base 500. The location of the return slot(s) 502, support cavity(s) 503, and handle opening(s) 504 can vary as desired to vary the position of the chip return location and the vertical supports location with respect to the storage base 500. As should be understood, the number of return slots 502, support cavities 503, and handle holes 504 can vary as desired.

Figure 5B:
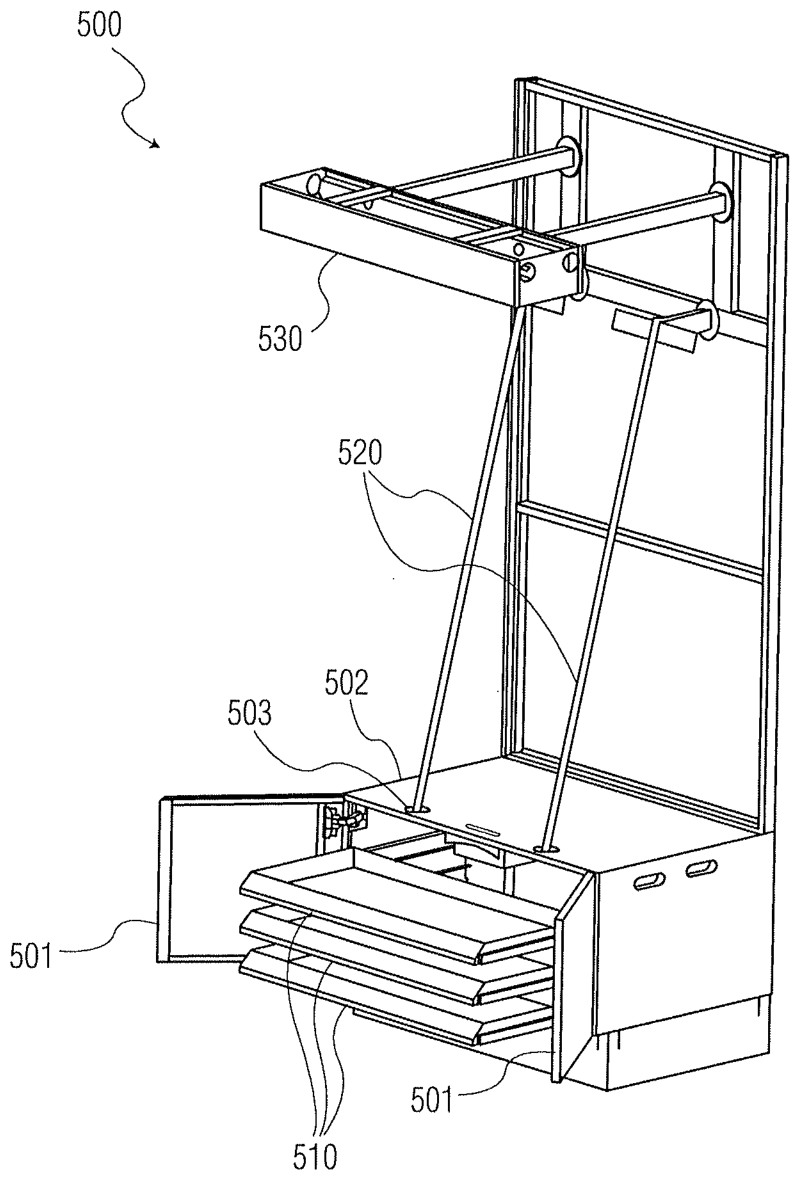
FIG. 5B illustrates an exemplary storage base of a main display unit configured to be part of the main display unit.

FIG. 5B illustrates an exemplary segment 500 of a main display unit (not shown) configured according to the present disclosure. The segment 500 includes a storage base 502 that includes two front panels 501. The front panels 501 provide access to one or more sliding drawers 510 located inside the storage base 500. These front panels 501 may open laterally or vertically, they may be hinged (as shown) or slide-able, and they may be fixed or removable. Although two front panels 501 are shown, it should be understood that the exemplary storage base 500 may include any number of desired front panels.

An end of each of two vertical supports 520 of a main display unit may be positioned and connected within respective support cavities 503. In an embodiment, one or more color pods (not shown) can be connected (rotatably or fixed) to each of the vertical supports 520. The exemplary segment 500 also includes an optional lighting fixture 530.

Figure 6:
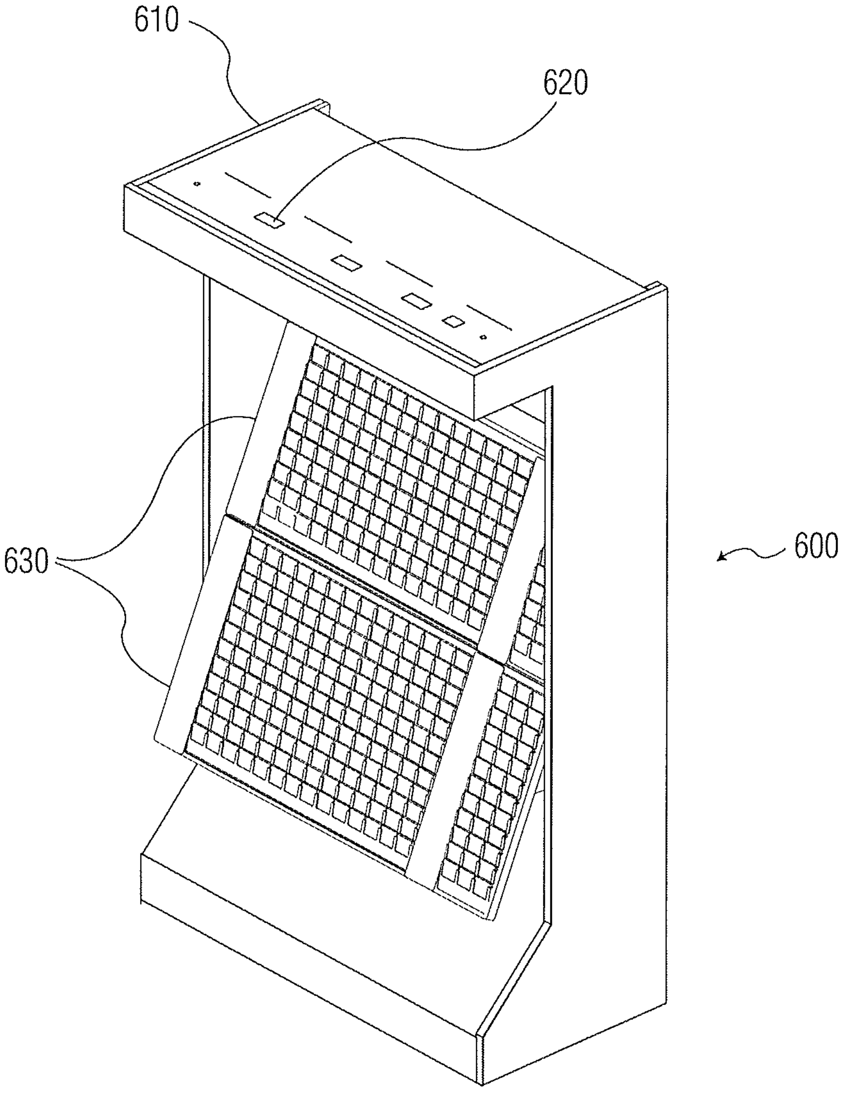
FIG. 6 illustrates a first sub-display portion of a secondary display unit according to the present disclosure.

FIG. 6 illustrates an exemplary first sub-display 610 of a secondary display unit 600 according to the present disclosure. The first sub-display 610 includes one or more color selection pods 630 each holding a number of color chips in which the colors can be directed to one or more particular color categories or themes. The first sub-display 610 may also include optional vent slots 620 that can allow for heat from an optional lighting fixture(s) (not shown) to disperse.

Figure 7:
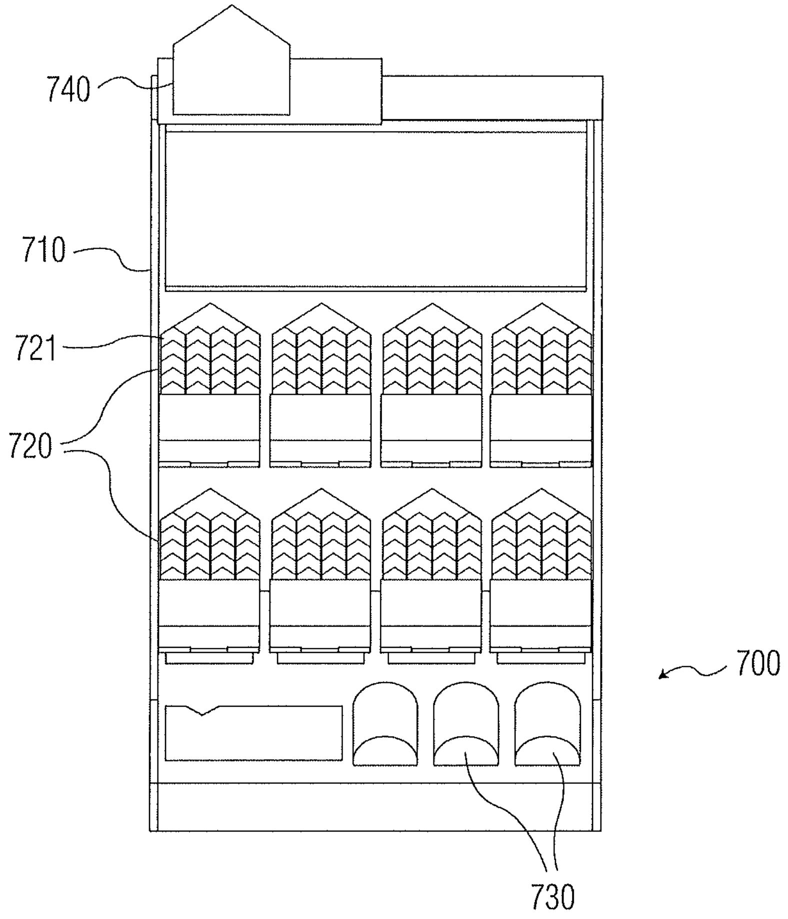
FIG. 7 illustrates a second sub-display portion of a secondary display unit according to the present disclosure.

FIG. 7 illustrates an exemplary second sub-display 710 of a secondary display unit 700 according to the present disclosure. The second sub-display 710 includes one or more color selection pods 720 containing any number of color chips 721 representative of one or more particular color categories or themes. The second sub-display 710 may include optional receptacles 730 that can provide storage for other materials and/or information. The second sub-display 710 may also include a label or sign 740 along a top side of the sub-display 710 that can denote a particular color category or theme.

Figure 8:
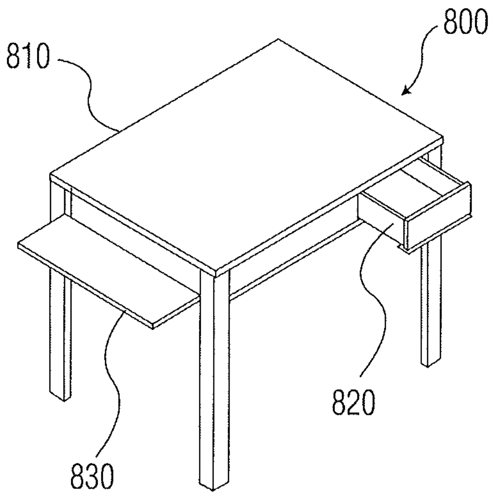
FIG. 8 illustrates a work table according to the present disclosure.

FIG. 8 illustrates an exemplary work table 800 of a central work center according to the present disclosure. The work table 800 includes a sliding surface 830 underneath a top side of table 800. The sliding surface 830 can be extended outward from the table 800 in order to accommodate large stores or activity. The work table 800 may also include one or more built-in drawers 820 which can be used for storage, for example. The work table 800 can be of any desired size, shape and/or height and be made of any desired material.

Figure 9:
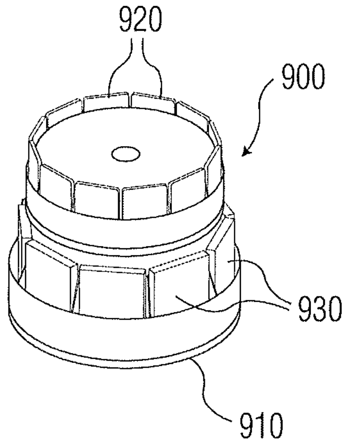
FIG. 9 illustrates a rotating color display unit according to the present disclosure.

FIG. 9 illustrates an exemplary rotating color display unit 900 according to the present disclosure. The rotating color display unit 900 may include a rotating base 910 and any number and size of receptacles 920, 930 for holding color chips and/or other materials. The rotating color display unit 900 can be positioned on top of a work table (e.g., work table 800 in FIG. 8) to provide a central work center.

Exemplary Features

As will be evident from the foregoing descriptions, the color display system of the present disclosure provides many features for both novice and advanced users. A non-exhaustive listing of several of such features are listed below. Notably, this list is provided for illustrative purposes only, and it should not be construed as limiting in any way:

The color display system of the present disclosure:

1. offers a layered selection experience that invites users to choose from hundreds of colors without feeling overwhelmed;

2. is inherently dynamic, and as a result, inspires users to consider new colors while at the same time availing the users to traditional colors;

3. attracts foot traffic, curiosity and engagement, thereby increasing sales;

4. provides an organized system and method of viewing, displaying and selecting colors;

5. is able to divide and group colors (e.g., by color family, color category and/or color saturation) in a manner that provides visual relief and avoid the effects of continuous spectrums in which colors blur into one another;

6. is uniquely interactive insofar as color selection pods are rotatable. This movement enables both a macro- and micro-entry into the selection of color, as well as the ability to isolate and focus in on certain color families/categories; and 7. includes optional signage that reinforces interaction cues as well as provides valuable information to users.

The foregoing examples and descriptions are provided merely for the purpose of explanation and are in no way to be construed as limiting. While reference to various embodiments are shown, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses.

The invention claimed is:

1. A color selection device comprising:

a color selection pod, comprising:

a first side and a second side opposite the first side, the first side and the second side defining a cavity therebetween, the first side designating a first color and the second side containing a receptacle, the receptacle extending from the second side and configured to hold one or more removable chips, each chip designating a second color, wherein the second color corresponds to the first color or a shade of the first color.

2. The color selection device of claim 1, wherein the second side contains a second receptacle holding a second one or more removable chips, wherein each of the second removable chips within the second receptacle is designated a third color different from the second color.

3. A color selection display system comprising:

a rotatable color selection pod, comprising:

a first side and a second side opposite the first side, the first side and the second side defining a cavity therebetween, the first side designating a first color and the second side containing a plurality of receptacles, each receptacle separately extending from the second side and configured to hold one or more removable chips, each chip designating a second color, wherein the second color corresponds to the first color or a shade of the first color; and a center axis, wherein the color selection pod is rotatable about the center axis so that either the first side or the second side is facing a front of the color selection display system.

4. The color selection display system of claim 3, wherein the color selection pod is mounted on a vertical support.

5. A color selection display system comprising:

a plurality of color selection pods, each color selection pod comprising:

a first side and a second side opposite the first side, the first side and the second side defining a cavity therebetween, the first side defining at least a first color and the second side containing one or more receptacles, each receptacle configured to hold one or more chips that are completely removable and replaceable within the receptacle, each chip defining a second color, wherein the second color corresponds to the first color or a shade of the first color, wherein the first color is different for each color selection pod.

6. The color selection display system of claim 5, wherein the plurality of color selection pods are arranged in a column.

7. A color selection display system comprising:

a plurality of color selection pods, each having at least two sides, with a first side containing at least a first designated color and a second side containing one or more receptacles each holding one or more removable chips, and with each chip containing a second designated color, wherein the second designated color corresponds to the first designated color or a shade of the first designated color, wherein each first designated color is different for each color selection pod; and one or more beacons adjacent to one or more of the plurality of color selection pods, wherein each of the one or more beacons contains a plurality of sections, and with each section containing a beacon color chip and with the beacon color chip of each section being different from each other, wherein the beacon color chips of the plurality of sections are at least one of different in color from the color selections pods or correspond to at least one of the first designated color, the shade of the first designated color, the second color or a shade of the second designated color, of one or more of the plurality of color selection pods.

8. The color selection display system of claim 5, wherein the plurality of color selection pods are arranged in a defined number of rows and a defined number of columns.

9. The color selection display system of claim 8, wherein the plurality of color selection pods are arranged in the defined number of rows and the defined number of columns based on color similarities between each first color to adjacent color selection pods.

10. The color selection display system of claim 5, wherein one or more of the color selection pods are rotatable.

11. The color selection display system of claim 5, wherein each of the color selection pods are mounted on a vertical support.

12. A color selection display system comprising:

a plurality of color selection pods, each having at least two sides, with a first side containing at least a first designated color and a second side containing one or more receptacles each holding one or more removable chips, and with each chip containing a second designated color, wherein the second designated color corresponds to the first designated color or a shade of the first designated color, wherein each first designated color is different for each color selection pod; and one or more storage bases positioned beneath the plurality of color selection pods, said one or more storage bases comprising one or more front panels for providing access to an interior of said storage bases, one or more shelving units within said interior, and defining one or more cavity structures configured to support one or more vertical supports.

13. The color selection display of claim 5, further comprising one or more lighting fixtures positioned above the plurality of color selection pods for illuminating said color selection pods, wherein at least one of said lighting fixtures comprises at least one reflective surface.

14. The color selection display of claim 5, wherein the plurality of color selection pods are arranged in columns of eight and rows of three.

15. A display assembly, comprising:

one or more rotatable pods, each pod having a first side and a second side opposite the first side, the first side and the second side defining a cavity therebetween;

one or more vertical supports, wherein the one or more rotatable pods are mounted on the one or more vertical supports; and a color beacon mounted on the one or more vertical supports, wherein the first side and the second side differ, wherein each pod is rotatable so that either the first side or the second side is facing a front of the display assembly.

16. The display assembly of claim 15, wherein the one or more vertical supports are oriented at least one of generally vertically and angled.

17. The display assembly of claim 15, further comprising at least three pods.

18. The display assembly of claim 15, further comprising a secondary display and a work station positioned relative to the display assembly.

19. A method of forming a display system, comprising:

forming one or more color selection pods, each color selection pod having a first side and a second side opposite the first side, the first side and the second side defining a cavity therebetween;

forming a plurality of receptacles on the second side, each receptacle extending from the second side and configured to hold one or more removable chips;

designating a first color to the first side; and for each receptacle, designating a second color to the receptacle such that each chip is formed from the second color.

20. The method of claim 19, further comprising:

forming one or more modular assembly components comprising a main display, a secondary display positioned adjacent to the main display and a work area assembly positioned proximate the main and secondary displays.

21. The method of claim 20, further comprising:

organizing a plurality of color samples by color families on different color section pods, wherein the secondary display comprises a plurality of recommended color samples, and wherein the number of color samples in the secondary display is equal to, greater than or less than the number of color samples in the main display.

22. The method of claim 19, further comprising rotatably mounting the one or more color selection pods to one or more vertical supports within the display system such that either the first side or the second side is facing a front of the display system.

23. The method of claim 19, wherein the first designated colors are different for each color selection pod.

24. The method of claim 19, wherein, for each color selection pod, the second designated color corresponds to the first designated color or a shade of the first designated color, and wherein the display system further comprises one or more beacons, each containing one or more sections that each contains a designated beacon color chip, said one or more beacons being at least one of rotatable and stationary.

25. The method of claim 19, further comprising:

arranging the one or more color selection pods in a defined number of rows and a defined number of columns.

26. The method of claim 19, wherein the one or more receptacles each holds one or more removable chips having different designated colors than all other receptacles.

27. The method of claim 20, further comprising:

displaying paint colors in a manner that emphasizes certain product lines of paint over others, by displaying designated product lines of paint colors to be emphasized in the main display and displaying other product lines of paint colors in the secondary display.

28. The method of claim 20, further comprising:

arranging the main display and the secondary display in at least one of a generally L-shaped structure and a generally I-shaped structure.

* * * * *